United States Patent [19]

Elliott

[11] Patent Number: 4,894,522
[45] Date of Patent: Jan. 16, 1990

[54] INTERFACE APPARATUS

[75] Inventor: Randy D. Elliott, Eugene, Oreg.

[73] Assignee: Spectra-Physics, Inc., San Jose, Calif.

[21] Appl. No.: 123,356

[22] Filed: Nov. 19, 1987

[51] Int. Cl.$^4$ ............................................. G06K 7/10
[52] U.S. Cl. .................................... 235/472; 235/462;
364/709.1; 340/825.21
[58] Field of Search ............... 235/375, 380, 385, 462,
235/472; 364/709.11, 900; 340/825.21, 825.52

[56] References Cited

U.S. PATENT DOCUMENTS

| | | | |
|---|---|---|---|
| 3,986,169 | 10/1976 | Kobayashi et al. | 340/825.52 |
| 4,621,325 | 11/1986 | Naftzger et al. | 235/385 X |
| 4,639,727 | 1/1987 | Blasius et al. | 340/825.57 |
| 4,654,793 | 3/1987 | Elrod | 235/380 X |
| 4,761,544 | 8/1988 | Poland | 235/472 X |
| 4,781,596 | 11/1988 | Weinblatt | 235/472 X |
| 4,806,743 | 2/1989 | Thenery | 235/472 |

Primary Examiner—David L. Trafton
Attorney, Agent, or Firm—Killworth, Gottman, Hagan & Schaeff

[57] ABSTRACT

A scanner includes a microprocessor for controlling operation of the scanner, and an interface circuit, which connects the microprocessor to a host computer and transfers data from the microprocessor to the host computer. Interface apparatus provides an interface between the scanner interface circuit and a personal computer, permitting the personal computer to act as a host. The interface apparatus includes a printed circuit board, output means, mounted on the printed circuit board, for transmitting data from the personal computer to the scanner interface circuit under control of an output strobe signal, and input means, also mounted on the printed circuit board, for transmitting data from the scanner interface circuit to the personal computer under control of an input strobe signal. The interface apparatus further includes an address means, mounted on the printed circuit board, for providing the output and input strobe signals to the output means and the input means, respectively.

10 Claims, 6 Drawing Sheets

INTERFACE APPARATUS

BACKGROUND OF THE INVENTION

The present invention relates to computer controlled bar code scanners and, more particularly, to an interface which permits such scanners to be controlled by and transfer data to a personal computer.

Laser scanners are known in which a beam of laser light is swept in a scan pattern to find and read a bar code. The bar code is printed on a surface which is presented to the scanner, such as for example a package label. Bar code labels are used on a broad range of retail packages for check-out and inventory purposes. A scanner, located for example at the check-out station in a retail establishment, is used by a clerk to enter automatically product identification data into the host computer of an associated computer system. The host computer then totals the prices of the products purchased by a customer, computes any applicable taxes, and causes a cash register printer associated with the scanner to print a receipt. The computer system keeps accurate records of sales by specific product which permit desired inventory levels to be maintained.

Typically such a scanner includes a laser source, such as a gas discharge laser, which produces a low power laser beam. The beam then passes through appropriate optical lenses and is swept across the package surface by a motor-driven, rotating mirror assembly. A portion of the light reflected from the package surface returns through the optical lenses to a detector which provides an electrical signal in dependence upon the level of the reflected light. A signal processing system in the scanner then analyses the electrical signal and translates the scanned characters into data which is transmitted to the host computer.

The computer then determines the total price of the products being purchased, as well as storing the identity of the purchased products for inventory and accounting purposes. The host computer may be located in the cash register associated with the scanner. Alternatively, a single host computer may service a number of scanners at the retail establishment.

Typically, the host computer in such a scanner system is a large, mainframe computer which is capable of servicing simultaneously a large number of scanners. Such a computer will include specially designed interface circuitry which permits the host computer to function in this fashion. A need exists, however, for much smaller point of sale scanner systems in which the scanner is coupled to a personal computer. In a small retail establishment, for example, only a single scanner may be needed at the store's sole check-out location. Clearly, the computing power of a personal computer is more than adequate for such a point of sale system. A need exists, however, for an interface arrangement which is carried on a single circuit board configured to be inserted directly into an expansion slot of a personal computer.

SUMMARY OF THE INVENTION

This need is met by an interface apparatus, according to the present invention, for interfacing between a personal computer and an optical scanner of the type which scans bar code labels and provides data related thereto to a host computer. The interface apparatus permits the personal computer to act as the host computer for the scanner. The scanner includes a microprocessor for controlling operation of the scanner, and an interface circuit, which connects the microprocessor to a host computer and transfers data from the microprocessor to the host computer. The interface apparatus includes a printed circuit board, output means, mounted on the printed circuit board, for transmitting data from the personal computer to the scanner interface circuit under control of an output strobe signal, and input means, also mounted on the printed circuit board, for transmitting data from the scanner interface circuit to the personal computer under control of an input strobe signal. The interface apparatus further includes an address means, mounted on the printed circuit board, for providing the output and input strobe signals to the output means and the input means, respectively.

The output means may comprise a latch circuit, responsive to the output strobe signal and to the personal computer, for receiving a data signal from the personal computer and providing the data signal to the output of the latch circuit upon receipt of the output strobe signal, the output means may further comprise an output circuit, responsive to the output of the latch circuit, for providing the data signal to the interface circuit of the scanner.

The input means may comprise a coupling means, responsive to the interface circuit of the scanner, for providing a data signal from the scanner at the output of the coupling means while maintaining electrical isolation between the interface circuit of the scanner and the output of the coupling means, and a filter means, responsive to the output of the coupling means, for filtering the data signal received from the coupling means and providing the resulting filtered data signal at its output. Further, the input means may comprise a switch means, responsive to the input strobe signal and to the filtered data signal, for supplying the filtered data signal to the personal computer in response to receipt of the input strobe signal.

The address means is responsive to the personal computer and provides the input and output strobe signals in response to the receipt by the address means of data defining an address which is unique to the interface apparatus and a read or write signal, respectively. The address data consists of a first portion which is fixed, and a second portion which is unique to the particular interface apparatus. The address means may comprise address select circuitry for manual selection of the second portion of the address, decoder means for detecting whether the address data from the personal computer corresponds to the first portion of the address. The address means further includes first multiplex means, responsive to the personal computer and to the decoder means, for providing a signal on one of a plurality of output lines in response to the second portion of the address received from the personal computer upon receipt of the read signal when the decoder means detects the first portion of the address. Additionally, the address means includes first demultiplex decoder means, responsive to the address select circuitry and to the first multiplex means, for providing an input strobe signal to the input means when the one of the plurality of output lines corresponds to the second portion of the address.

The address data consists of a first portion which is fixed, and a second portion which is unique to the particular interface apparatus. The address means comprises address select circuitry for manual selection of the second portion of the address, decoder means for detecting whether the address data from the personal computer corresponds to the first portion of the address. The address means further includes a second multiplex means, responsive to the personal computer and to the decoder means, for providing a signal on one of a plurality of output lines in response to the second portion of the address received from the personal computer upon receipt of the write signal when the decoder means detects the first portion of the address. Additionally, the address means includes a second demultiplex decoder means, responsive to the address select circuitry and to the second multiplex means, for providing an output strobe signal to the output means when the one of the plurality of output lines corresponds to the second portion of the address.

The address data consists of a first portion which is fixed, and a second portion which is unique to the particular interface apparatus. The address means comprises address select circuitry for manual selection of the second portion of the address. The output circuit comprises at least one NAND gate for inverting the output of the latch circuit. The coupling means comprises an opto-coupling circuit for maintaining electrical isolation between the interface circuit of the scanner and the output of the coupling means. The filter means comprises a low pass filter circuit.

Accordingly, it is an object of the present invention to enable a personal computer to act as a host computer for an optical bar code scanner; to provide interface apparatus which interfaces a scanner and a personal computer; to provide such an interface in which the circuit components may be mounted on a single circuit board; and to provide interface apparatus which may be inserted directly into the expansion slot of a personal computer.

Other objects and advantages of the invention will be apparent from the following description, the accompanying drawings and the appended claims.

DETAILED DESCRIPTION OF THE PREFERRED EMBODIMENT

Figure 1:
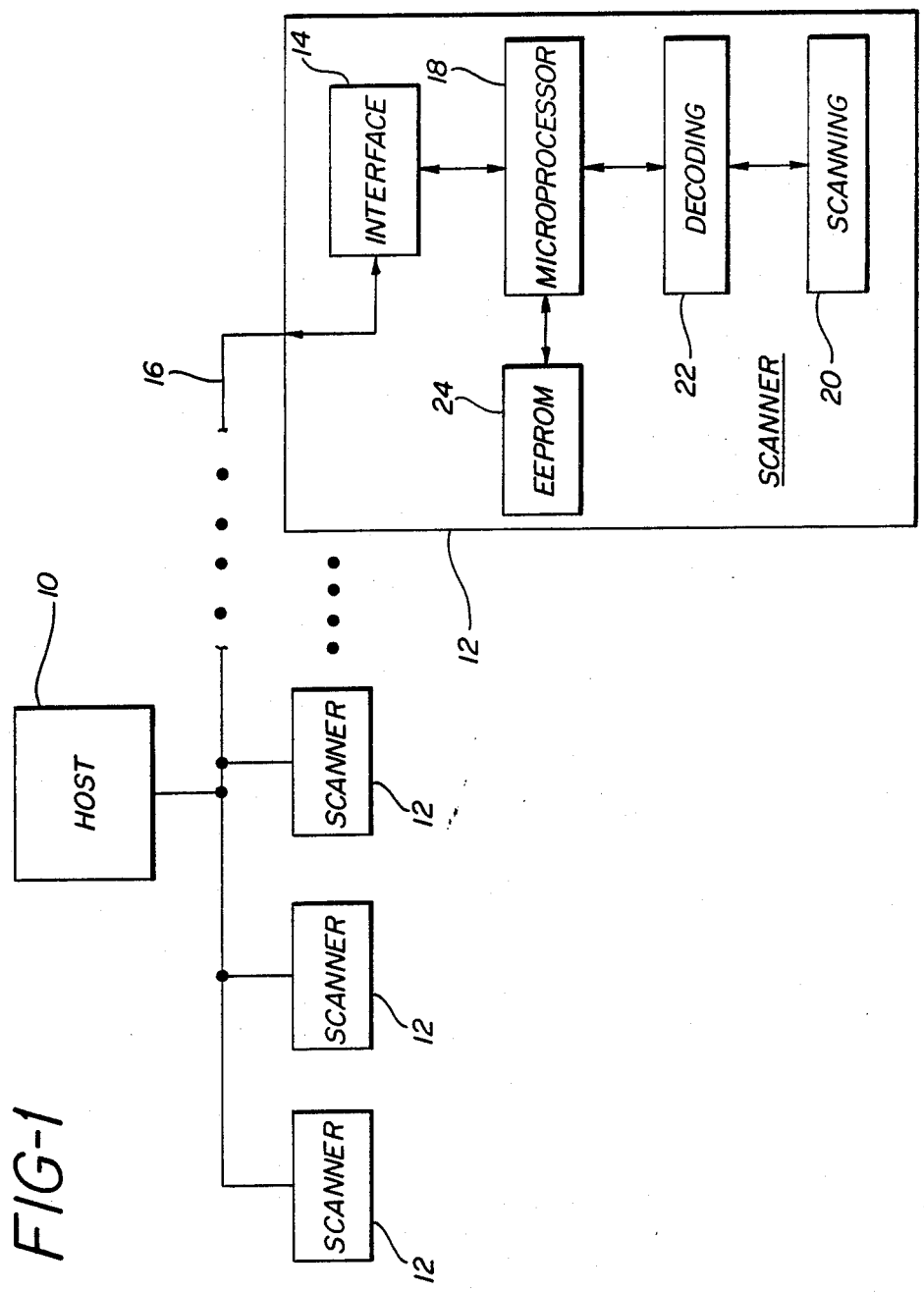
FIG. 1 is a schematic diagram showing a bar code scanning system controlled by a host computer.

Reference is made to FIG. 1 of the drawings which illustrates a scanner system including a plurality of scanners 12 for scanning bar code labels and for providing data related thereto to a host computer 10. Since each of the scanners 12 are identical, the electrical system of only one of the scanners is shown in somewhat greater detail.

Figure 2:
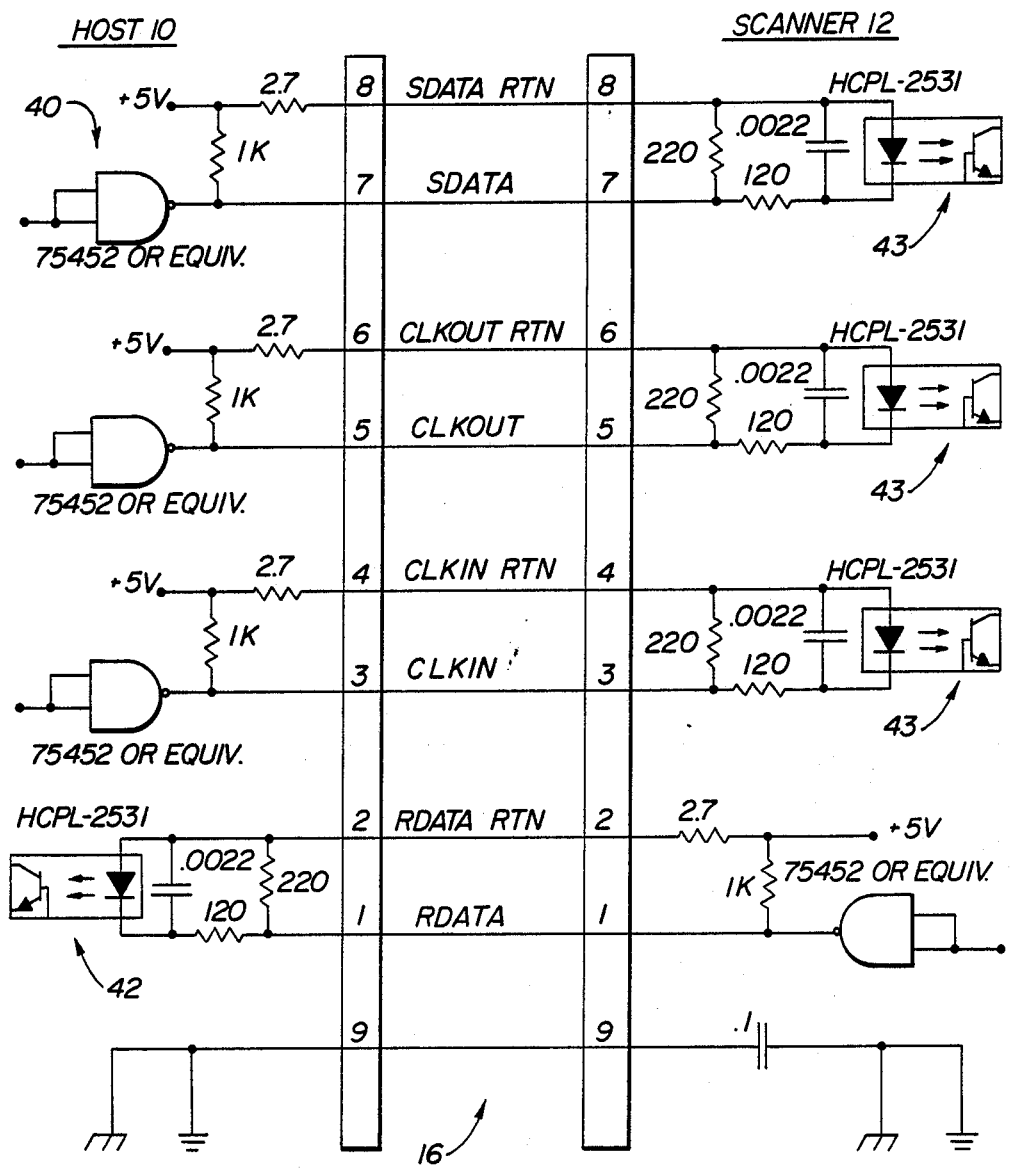
FIG. 2 is an electrical schematic diagram illustrating the electrical connections between the host computer and a scanner of FIG. 1.

The scanner 12 includes interface circuitry 14 which communicates with the host computer over line 16. Line 16, although illustrated by a single line in FIG. 1, is actually a plurality of lines which provide for two way communication between host computer 10 and each of scanners 12, as illustrated in FIG. 2 and discussed below. Transmission of data is accomplished in a serial format.

A microprocessor circuit 18 is responsive to scanning circuitry 20 and decoding circuitry 22 for controlling operation of the scanner, identifying the characters on the scanned labels and transmitting the data produced by the scanning operation to the host computer 10 via interface circuit 14 over the line 16. Scanning means 20 optically scans bar code labels and provides an electrical signal in response thereto. Decoding circuit 22 is responsive to the scanning means 20 for translating the electrical signal into a digital signal. An example of such circuitry is shown in U.S. patent Ser. No. 063,538, filed June 18, 1987, entitled SIGNAL TRANSITION DETECTION METHOD AND SYSTEM.

A control memory comprising electrically erasable programmable read only memory (EEPROM) 24 communicates with the microprocessor 18 and stores a plurality of sets of control characters in a non-volatile manner. The control memory 24 stores, for example, characters which, when read on bar code labels, indicate that more than one label is affixed to a single product. The scanner 12 is disclosed in greater detail in copending U.S. patent application Ser. No. 122,743, now U.S. Pat. No. 4,866,257 filed Nov. 19, 1987, entitled BAR CODE SCANNER AND METHOD. The use of EEPROM 24 to store the control characters permits the scanner 12 to be programmed to recognize any desired control characters, and multiple sets of such characters as indicating a pair of labels on a single product. Further, the EEPROM 24 maintains the stored control characters in memory even when power to the scanner is terminated, but allows the stored control character sets to be easily verified or altered by the host computer 10.

In a large retail establishment, a single, relatively large host computer 10 may service a great many scanners The host computer 10 will typically include an interface 40 for providing an interface with each of the scanners 12, as shown in FIG. 2. The interface 40 comprises an optically isolated interface including opto-isolator 42 in the data return path for data received by the host computer 10 from the scanner 12. The interface 14 of the scanner 12 preferably includes opto-isolator circuits 43 for isolating the transmissions from the host computer 10 to the scanner 12. The lines labeled RDATA RTN, RDATA/, SDATA RTN, SDATA, CLKOUT RTN, CLKOUT/, CLKIN RTN, and CLKIN/, all are provided within cable 16. Data to the scanner 12 is transmitted over lines SDATA/ and SDATA RTN under control of clock signals provided on lines CLKOUT/ and CLKOUT RTN. Similarly, data from the scanner 12 is transmitted over lines RDATA/ and RDATA RTN under control of clock signals provided on lines CLKIN/ and CLKIN RTN.

Figure 3:
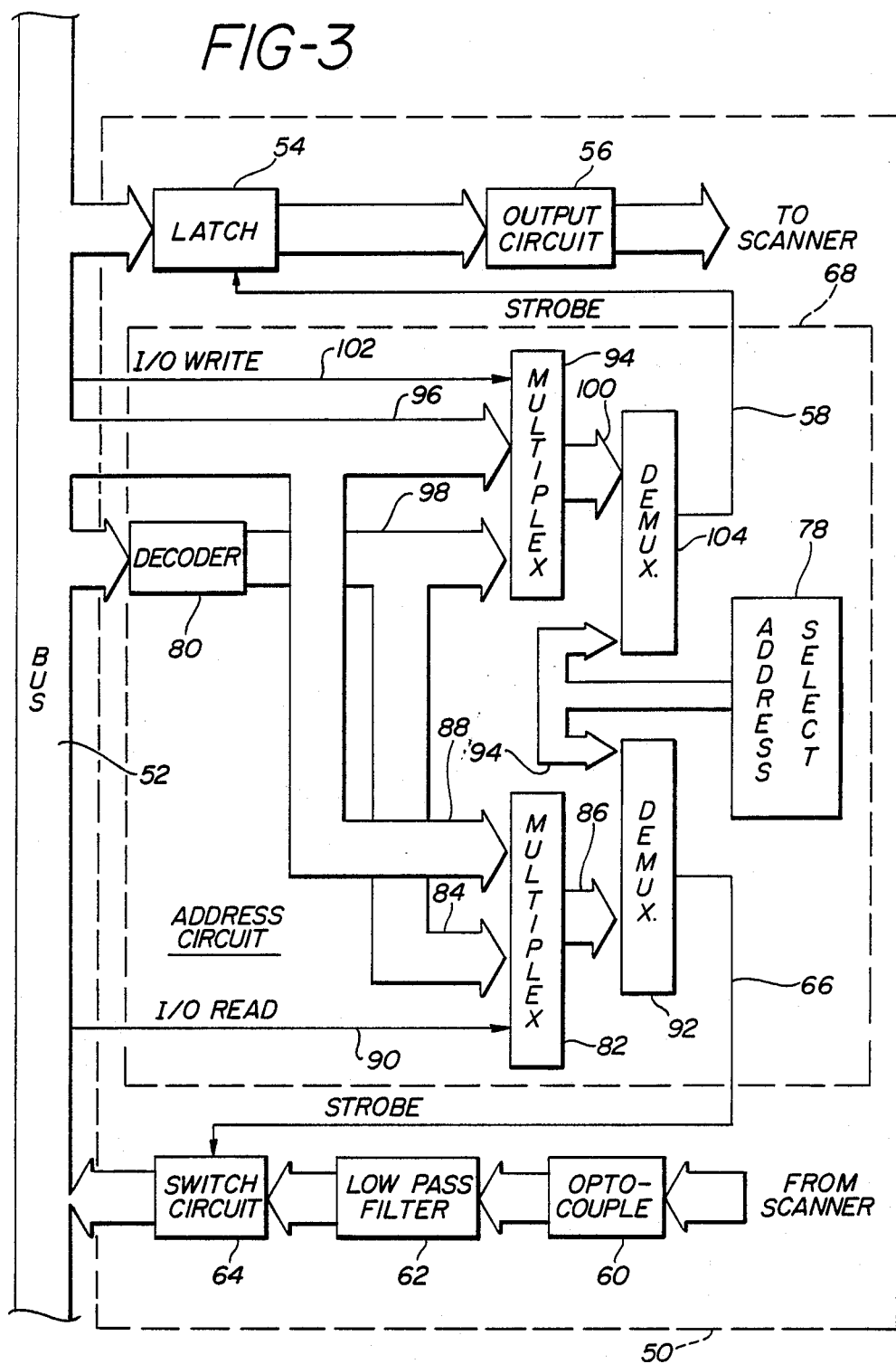
FIG. 3 is a block diagram illustrating the interface apparatus of the present invention.

It will be appreciated that in certain instances it will not be desireable to use a relatively large, expensive computer as the host computer for a scanner. This is especially true where only one or only a few scanners are to be serviced by the same host computer. Rather, it may be desired to use a personal computer, such as for example an IBM PC computer, as the host computer. The present invention as shown diagrammatically in FIG. 3, contemplates interface apparatus which may be constructed on a single printed circuit board 50, and inserted in one of the expansion slots of a personal computer. The main data bus of the personal computer is illustrated at 52.

An output means, including latch circuit 54 and output circuit 56, is mounted on said printed circuit board 50, for transmitting data from the personal computer to the scanner interface circuit 14 under control of an output strobe signal on line 58. Similarly, an input means, including a coupling means comprising opto-couple circuit 60, a filter means including low pass filter circuit 62, and a switch means comprising switch circuit 64, is mounted on the printed circuit board 50, for transmitting data from the scanner interface circuit 14 to the personal computer via bus 52 under control of an input strobe signal on line 66. An address means 68, also mounted on said printed circuit board 50, provides the output and input strobe signals on lines 58 and 66 to said output means and said input means, respectively.

Figure 4:
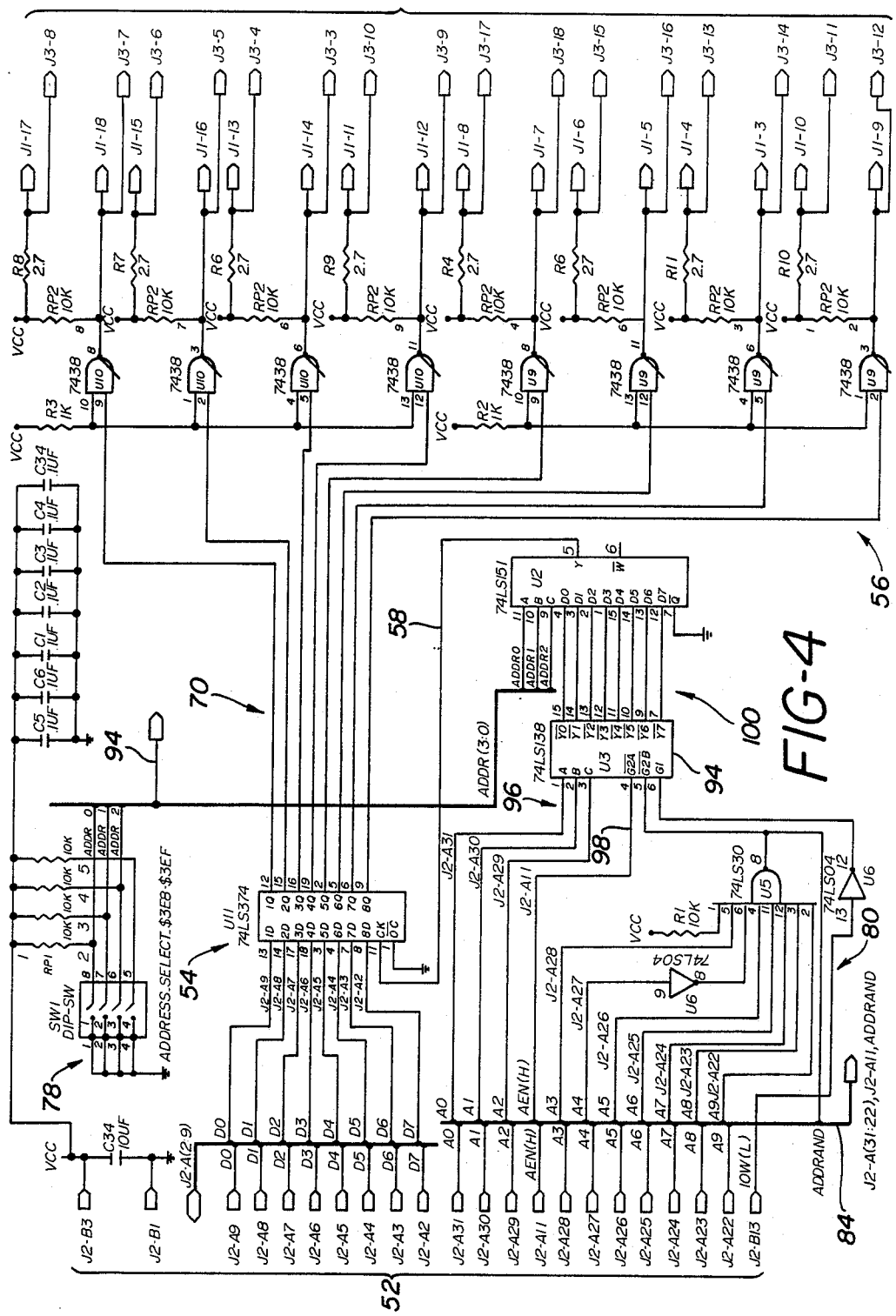
FIGS. 4, 5, and 6 are electrical schematic diagrams which collectively illustrate the interface of the present invention is greater detail.

The latch circuit 54 is responsive to the output strobe signal on line 58 and to the personal computer bus 52, for receiving a data signal from the personal computer and providing the data signal to the output of said latch circuit 54 upon receipt of said output strobe signal. The output circuit 56, responsive to the output of the latch circuit 54, provides the data signal to the interface circuit 14 of the scanner 12 in a serial format. As may be seen in FIG. 4, when the strobe signal on line 58 goes LOW, the latch circuit 54 is enabled to provide outputs on lines 70. Three of these outputs may be utilized for the SDATA, CLKOUT, and CLKIN signals which are directed to each scanner 12 via associated NAND gates U9 which comprise the output circuit 56. As a consequence, the eight separate outputs available as illustrated in FIG. 4 may be utilized to control two scanners (three outputs from NAND gates U9 for each of the scanners 12, and two unused outputs).

Figure 5:
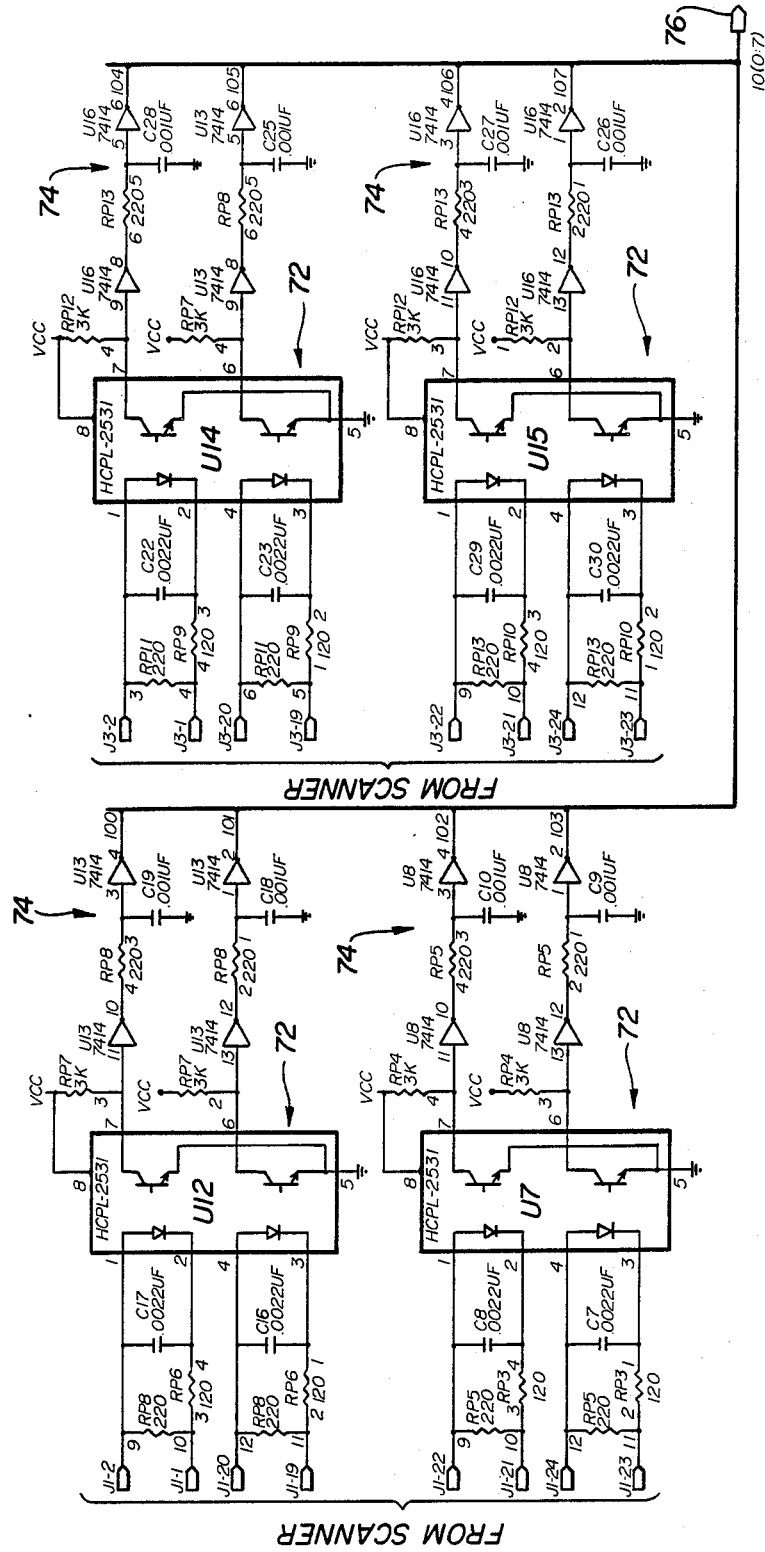

The coupling means, comprising opto-coupling circuit 72, is responsive to the interface circuit 14 of the scanner 12, for providing a data signal from the scanner 12 at the output of the coupling means while maintaining electrical isolation between the interface circuit 14 of the scanner 12 and the output of the coupling means. As seen in FIG. 5, four opto-coupling circuits 60 are provided on the circuit board 50. As will be recalled from FIG. 2, only one such circuit is required for the data returning to the host computer from the scanner 12. As a consequence, multiple scanners may be serviced by the interface apparatus providing communication in both directions.

Figure 6:
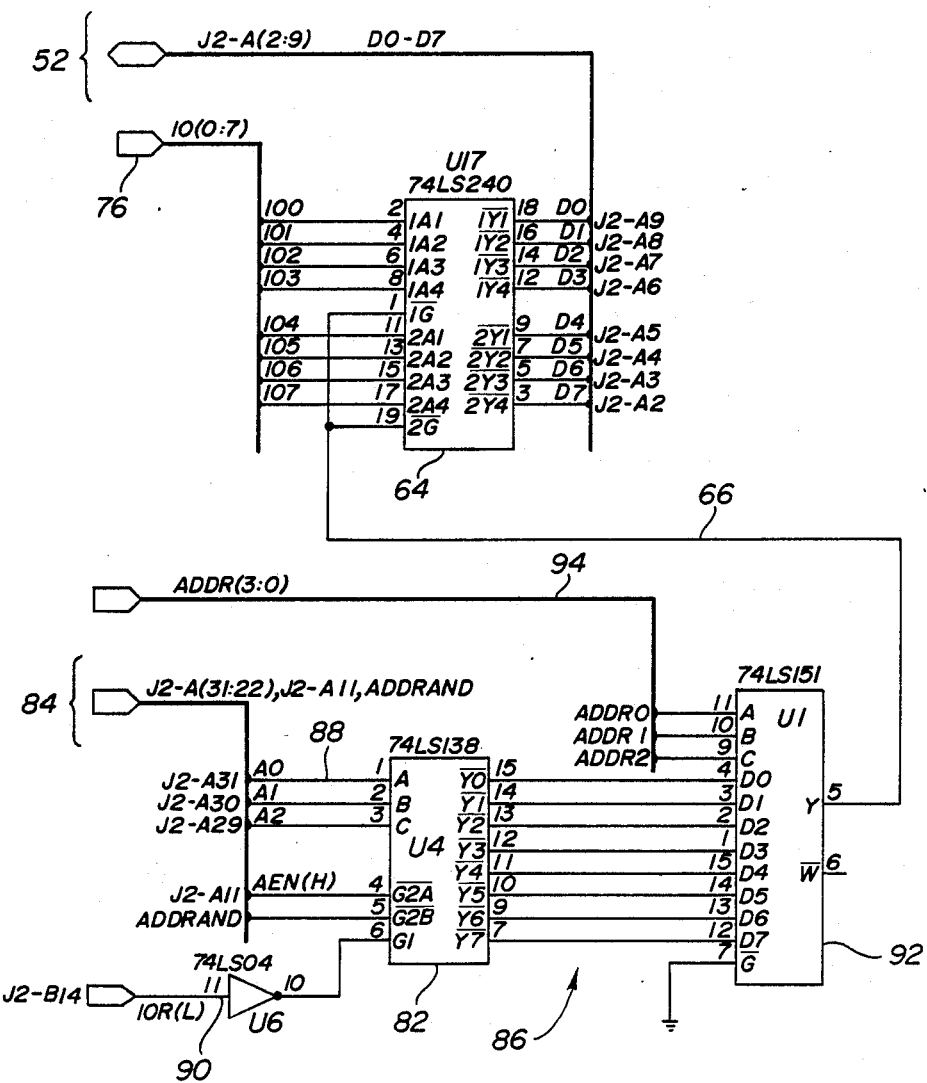

The filter means comprises low pass filter circuits 74, which are responsive to the output of the coupling means, filter the data signals received from the coupling means and providing the resulting filtered data signal on output lines 76. As seen in FIG. 6, the switch means, comprising switch circuit 64, is responsive to the input strobe signal on line 66 and to the filtered data signal on lines 76, for supplying the filtered data signal to the personal computer bus 52 in response to receipt of the input strobe signal.

The address means 68 is responsive to the personal computer and provides the input and output strobe signals in response to the receipt by the address means of data defining an address which is unique to the particular interface apparatus on printed circuit board 50. It will be appreciated that several such boards may be inserted in a personal computer and that each such board will have an address which is unique. The address data consists of a first portion of the address which is fixed and which will be the same for all such boards, and a second portion which is unique to the particular interface apparatus on the board 50.

The address means 50 comprises address select circuitry 78 for manual selection of the second portion of the address. As seen in FIG. 4, the circuitry 78 comprises a plurality of manually actuatable switches which are used to define the unique portion of the address.

A decoder means comprising a decoder circuit 80 detects whether the address data from the personal computer corresponds to the first portion of the address. As seen in FIG. 4, circuit 80 includes an invertor U6 and a NAND gate U5. A first multiplex means, including multiplex circuit 82 shown in FIG. 6, is responsive to the personal computer and to the decoder means via lines 84 and provides a LOW signal on one of a plurality of output lines 86 in response to the second portion of the address received from the personal computer on lines 88 upon receipt of the read signal on line 90 when the decoder means detects the first portion of the address.

A first demultiplex decoder means, including circuit 92, is responsive to the address select circuitry 78 via line 94 and to the first multiplex circuit 82 for providing an input strobe signal on line 66 to the input means when the one of the plurality of output lines 86 corresponds to the second portion of the address.

The portion of the address circuit 68 which produces the write strobe signal on line 58 to effect the transfer of data from the bus 52 of the personal computer to a scanner 12 operates in the same manner. A second multiplex means, including multiplex circuit 94, is responsive to the personal computer via lines 96 and to the decoder circuit 80 via lines 98 for providing a signal on one of a plurality of output lines 100 in response to the second portion of the address received from the personal computer upon receipt of the write signal on line 102 when the decoder circuit 80 detects the first portion of the address. A second demultiplex decoder means, including circuit 104, is responsive to the address select circuitry 78 and to the second multiplex means 94, for providing an output strobe signal on line 58 to the output means when the one of the plurality of output lines 100 corresponds to the second portion of the address.

In operation, the interface apparatus of the present invention allows at least two scanners to be controlled by a personal computer. It will be appreciated that this permits the use of extremely inexpensive point-of-sale systems which incorporate the advantages in inventory control and other business areas which result from precisely recording information with respect to product sales.

Having described the invention in detail and by reference to the preferred embodiment thereof, it will be apparent that other modifications and variations are possible without departing from the scope of the invention defined in the appended claims.

What is claimed is:

1. Interface apparatus for interfacing between a personal computer and an optical scanner of the type which scans bar code labels and provides data related thereto to a host computer, the interface apparatus permitting the personal computer to act as the host computer for the scanner, said scanner including a microprocessor for controlling operation of said scanner, and an interface circuit, which connects said microprocessor to a host computer and transfers data from said microprocessor to said host computer, comprising:
   a printed circuit board,
   output means, mounted on said printed circuit board, for transmitting data from the personal computer to the scanner interface circuit under control of an output strobe signal, input means, mounted on said printed circuit board, for transmitting data from the scanner interface circuit to the personal computer under control of an input strobe signal, and address means, mounted on said printed circuit board, for providing said output and input strobe signals to said output means and said input means, respectively.

2. The interface apparatus of claim 1, in which said output means comprises a latch circuit, responsive to said output strobe signal and to said personal computer, for receiving a data signal from said personal computer and providing said data signal to the output of said latch circuit upon receipt of said output strobe signal, and an output circuit, responsive to the output of said latch circuit, for providing said data signal to said interface circuit of said scanner.

3. The interface apparatus of claim 1, in which said put means comprises coupling means, responsive to said interface circuit of said scanner, for providing a data signal from said scanner at the output of said coupling means while maintaining electrical isolation between said interface circuit of said scanner and the output of said coupling means, filter means, responsive to the output of said coupling means, for fltering said data signal received from said coupling means and providing the resulting filtered data signal at its output, and switch means, responsive to said input strobe signal and to said filtered data signal, for supplying the filtered data signal to said personal computer in response to receipt of said input strobe signal.

4. The interface apparatus of claim 1, in which said address means is responsive to said personal computer and provides said input and output strobe signals in response to the receipt by said address means of data defining an address which is unique to the interface apparatus and a read or write signal, respectively.

5. The interface apparatus of claim 4 in which said address data consists of a first portion which is fixed, and a second portion which is unique to the particular interface apparatus, and in which said address means comprises address select circuitry for manual selection of the second portion of said address, decoder means for detectinq whether the address data from the personal computer corresponds to the first portion of the address, first multiplex means, responsive to said personal computer and to said decoder means, for providing a signal on one of a plurality of output lines in response to the second portion of the address received from said personal computer upon receipt of the read signal when said decoder means detects the first portion of the address, and first demultiplex decoder means, responsive to said address select circuitry and to said first multiplex means, for providing an input strobe signal to said input means when said one of said plurality of output lines corresponds to said second portion of said address.

6. The interface apparatus of claim 4 in which said address data consists of a first portion which is fixed, and a second portion which is unique to the particular interface apparatus, and in which said address means comprises address select circuitry for manual selection of the second portion of said address, decoder means for detecting whether the address data from the personal computer corresponds to the first portion of the address, second multiplex means, responsive to said personal computer and to said decoder means, for providing a signal on one of a plurality of output lines in response to the second portion of the address received from said personal computer upon receipt of the write signal when said decoder means detects the first portion of the address, and second demultiplex decoder means, responsive to said address select circuitry and to said second multiplex means, for providing an output strobe signal to said output means when said one of said plurality of output lines corresponds to said second portion of said address.

7. The interface apparatus of claim 4 in which said address data consists of a first portion which is fixed, and a second portion which is unique to the particular interface apparatus, and in which said address means comprises address select circuitry for manual selection of the second portion of said address.

8. The interface apparatus of claim 2 in which said output circuit comprises at least one NAND gate for inverting the output of said latch circuit.

9. The interface apparatus of claim 3 in which said coupling means comprises an opto-coupling circuit for maintaining electrical isolation between said interface circuit of said scanner and the output of said coupling means.

10. The interface apparatus of claim 3 in which said filter means comprises a low pass filter circuit.

* * * * *